US008949821B2

(12) United States Patent
Soh et al.

(10) Patent No.: US 8,949,821 B2
(45) Date of Patent: Feb. 3, 2015

(54) CAP FILE FOR THE PERSONALIZATION OF A JAVA APPLICATION

(75) Inventors: Kian Teck Soh, Singapore (SG); Arun Ganeswaran, Singapore (SG)

(73) Assignee: Cassis International Pte. Ltd, Singapore (SG)

( * ) Notice: Subject to any disclaimer, the term of this patent is extended or adjusted under 35 U.S.C. 154(b) by 1026 days.

(21) Appl. No.: 12/312,891

(22) PCT Filed: Nov. 30, 2007

(86) PCT No.: PCT/IB2007/003704
§ 371 (c)(1),
(2), (4) Date: May 29, 2009

(87) PCT Pub. No.: WO2008/068576
PCT Pub. Date: Jun. 12, 2008

(65) Prior Publication Data
US 2010/0077392 A1    Mar. 25, 2010

(30) Foreign Application Priority Data

Dec. 1, 2006    (EP) ..................................... 06301207

(51) Int. Cl.
*G06F 9/44* (2006.01)
*G06F 9/45* (2006.01)
*G06F 9/445* (2006.01)
*G07F 7/10* (2006.01)
*G06Q 20/34* (2012.01)

(52) U.S. Cl.
CPC ............ *G07F 7/1008* (2013.01); *G06Q 20/341* (2013.01); *G06Q 20/355* (2013.01)
USPC ........... 717/174; 717/114; 717/118; 717/139; 717/148

(58) Field of Classification Search
CPC ............ G60F 3/129; G60F 8/71; G60F 9/455
USPC ......................... 717/174, 114, 118, 139, 148
See application file for complete search history.

(56) References Cited

U.S. PATENT DOCUMENTS

| | | | | |
|---|---|---|---|---|
| 6,865,659 | B2 * | 3/2005 | Montemayor | 711/209 |
| 6,978,358 | B2 * | 12/2005 | Francis | 712/202 |
| 7,152,230 | B2 * | 12/2006 | Sato et al. | 717/178 |
| 7,162,628 | B2 * | 1/2007 | Gentil et al. | 713/100 |
| 7,281,244 | B2 * | 10/2007 | de Jong | 717/168 |
| 7,353,281 | B2 * | 4/2008 | New et al. | 709/229 |
| 7,500,236 | B2 * | 3/2009 | Janzen | 717/174 |
| 2005/0184165 | A1 * | 8/2005 | de Jong | 235/492 |
| 2007/0169043 | A1 * | 7/2007 | Violleau et al. | 717/149 |
| 2007/0207798 | A1 * | 9/2007 | Talozi et al. | 455/423 |
| 2008/0115117 | A1 * | 5/2008 | Wilkinson et al. | 717/139 |
| 2008/0268811 | A1 * | 10/2008 | Beenau et al. | 455/406 |
| 2008/0270302 | A1 * | 10/2008 | Beenau et al. | 705/42 |
| 2009/0290704 | A1 * | 11/2009 | Cimino | 380/28 |

* cited by examiner

*Primary Examiner* — Farley Abad
*Assistant Examiner* — Getente A Yimer
(74) *Attorney, Agent, or Firm* — James R. Klaiber; Pryor Cashman LLP

(57) ABSTRACT

A personalization method of one application capable of being executed on a Java card contains the successive steps of:
   generating a package containing mandatory components corresponding to the application, and a custom component corresponding to information required to personalize the application;
   loading the package onto a Java card;
   installing the application from the loaded package, the application being personalized according to the information as soon as the application is in the Installed state, i.e. at the end of the completion of the step of installing.

12 Claims, 1 Drawing Sheet

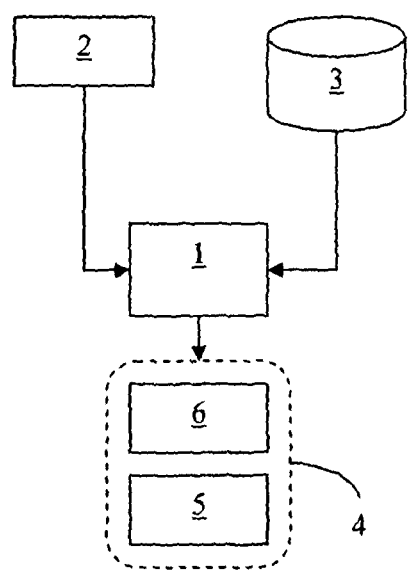

CAP FILE FOR THE PERSONALIZATION OF A JAVA APPLICATION

CROSS-REFERENCE TO RELATED APPLICATIONS

This application claims priority to PCT Application PCT/IB2007/003704, filed Nov. 30, 2007, and EPO Application 06301207.4, filed Dec. 1, 2006, the disclosures of which are incorporated herein by reference.

FIELD OF THE INVENTION

The invention relates to integrated circuit microprocessor cards, capable of processing applications. More particularly, the invention relates to such cards capable of processing Java Applets as defined by the Java Card Platform Specification which can be found at the following Internet address: java.sun.com/products/javacard/specs.html

BACKGROUND OF THE INVENTION

According to the Java Card technology, during the deployment of an application, the application goes through various states before it is actually ready to be used by a final user. The states which are of interest in the context of the present invention are Loaded, Installed, and Personalized states:
  The Loaded state indicates that the application has been loaded from a terminal, for example a desktop computer, onto the Java card which is, for example, inserted in a reading device (CAD device) in communication with said terminal;
  The Installed state indicates that the loaded application has been instantiated on the card, but the personalization data of the application has not yet been initialized;
  The Personalized state indicates that the installed application has been initialized, personalization data of the application having been set up with particular values. For example, the personalization data USER_NAME of an application has been initialized with the value "Name."

In order to effect a change of state, a series of command or operations must be executed. These commands generally imply data exchanges between the terminal and the Java card. These exchanges require a certain amount of communication time.

Loaded and Installed states are two basic states which cannot be avoided and are necessary. They are mandatory for every possible type of application. It is not possible to avoid these states without becoming non-compliant with the Java Card Specification.

On the other hand, the Personalized state is somewhat of an optional state. There are applications that have no personalization data and which thus become fully operational once the installation has been performed, i.e. while still in the Installed state, while others applications require a personalization of their data before becoming fully operational. The Java Card Specification does not provide an optimized method for personalization. Even the Java Card Specification refuses to define a specific personalization method, assuming that the method will be different for each application, depending, in particular, on how the application is built. On the one hand, this lack of standardization benefits the application developers in terms of flexibility, but, on the other hand, this flexibility in the software development can lead to a lack of efficiency in the manufacturing process.

The personalization time, i.e. the communication time necessary to complete the full personalization of the application, varies based on the amount of personalization data required by the application. When considering a single card, the personalization time can be seen as small and insignificant. But when considering a production environment where thousands or even millions of cards are to be produced, this personalization time is significant in terms of throughput, and thus affects the overall cost of the production of cards.

SUMMARY OF THE INVENTION

So the object of the present invention is to provide an improved method for the personalization of applications, a method which satisfy the constraints of the Java Card Specification, but which allows the requirements of mass production of cards containing personalized Applets to be met.

BRIEF DESCRIPTION OF THE DRAWINGS

Features and other aspects of embodiments of the present invention are explained in the following description taking in conjunction with the accompanying drawings, wherein:
  FIG. 1 illustrates a block diagram showing at a high-level the generation step according to the invention.

DETAILED DESCRIPTION

Various embodiments of the present invention will now be described in greater detail with reference to the drawings.

The present invention achieved this object by a personalization method of at least one application capable of being executed on a card. According to the invention the method, respecting the Java Card Specification, contains the successive steps of generating a package containing mandatory components corresponding to at least one application, and a custom component corresponding to information required to personalize the said at least one application; loading the said package onto a Java card; Installing said application from the said loaded package, the said at least one application being personalized as soon as the said application is in the Installed state at the end of the completion of the said step of installing.

Preferably, the step of generating a package consists in the use of means of generation, taking as input a first file containing only the mandatory components corresponding to the application, and a second file containing data required to personalize the application, in order to generate, as output, the package.

More preferably, the step of generating a package contains a further step consisting in extracting from a database said data required to personalize the application and to produce the second file before generating the package.

Preferably, the step of installing consists, during completion of an install command, in the use of a means of initializing objects for referring to the custom component each time an application variable is created The objects of the present invention are also achieved by a package, the format of which respects the Java Card specification, containing mandatory components corresponding to the application capable of being executed on a card, containing a custom component corresponding to information required to personalize the application, such that, after having been loaded and installed on said card, the application is personalized according to said information as soon as the application is in an Installed state The package is a JAR file or more preferably a CAP file.

The invention also relates to a custom component generator, capable of generating as output a package as mentioned above.

In an embodiment, the generator takes as input a first file containing only the mandatory components corresponding to the application and a second file containing data required to personalize said application.

The invention relates also to a means for initializing objects containing means for referring, each time an application variable is created, to a custom component of a loaded package as mentioned here above.

According to the invention, the personalization data for an application executed on a Java card can be packaged along with the application itself, using a custom component in a CAP file as allowed by the Java Card Specification. In so doing, the application becomes immediately and automatically personalized upon installation, i.e. in the Installed state, without the need for an additional set of commands or operations dedicated to affecting the personalization process, i.e. to effect a change of state from the Installed state to a Personalized state. Thus, according to the invention, most of the time taken by the personalization process according to prior art can be eliminated, leading to a faster deployment of the application.

In addition, the invention offers an easier manner for managing personalized applications. A combined CAP file defining a personalized application can easily be generated by receiving a custom component corresponding to a specific card, i.e. specific to a final user of the card. This step can be performed at a software level. Then this combined CAP file can be implemented to each specific card according to the currently used methods and hardware for loading and installing. On completion of the installation process, the card has been automatically personalized and is ready to be delivered to the final user.

Another advantage of the invention can be seen in the instance of application deployment in the telecom industry. Currently, where cards have been issued and are in use, only those applications which are fully compatible with the telecom specification (i.e. SIM Toolkit (STK) applications), can be deployed on these cars. Non-STK applications requiring personalization can not be fully deployed because they can only be loaded and installed but not personalized, the basic operations of the personalization process not being possible through the telecom channel.

But this problem can be overcome by using the package according to the invention which leads to the implementation of a fully personalized application by using only basic loading and installation operations which are authorized by the telecom channel. The corresponding application is then fully usable. An industrial application of the invention would be the deployment of non-STK applications on cards within mobile phones. Once installed, such non-STK personalized applications would allow interactions with other terminals without the need of telecom network.

The present invention is illustrated by way of example and is not limited by the shape of the figures of the accompanying drawing in which FIG. 1 is a block diagram showing at a high-level the generation step according to the invention.

The invention comprises of a method by which personalization of a Java Card application can be performed automatically at the same time as the installation step of the application, contrary to the prior art.

The invention consists of two items which are described in detail below.

The first item is a new custom component for the Java application Converted Applet file (CAP file). This component, hereafter referred to as the Perso component, shall contain all the relevant information needed to personalize an application on its installation. As this Perso component will not be a mandatory component, applications which do not wish to use this feature can simply ignore it.

The second item is a means for installation, referred to as the Object Installer, which is a module of the Java Card virtual Machine (JVCM) located and executed on the target Java Card. The role of this Object Installer module is to read the Perso component of the CAP files loaded on the card and to initialize appropriately the specific application data of the corresponding application. The Object Installer is executed when an installation command, such as for example the Install_For_Install command, is called for the corresponding application.

The Perso Component

The format of the Perso component is now defined. It is to be noted that this format respects the Java Card Specification. Its structure is a series of embedded Basic Encoding Rules of the type Tag/Length/Value (BER-TLVs or TLVs).

At a first level of TLVs and with a class notation, the custom component can be written as follows:

```
component {
U1 tag
U2 size
U1 info[ ]
}
```

According to the Java Card Specification, the Tag attribute identifies the type of the component by an integer coded on eight bits. The mandatory components are identify with the lower integers, whereas a greater predefined integer is attributed to the Perso component.

The Size attribute indicates the length of the Info attribute.

The end of the component, labeled by the Info attribute, forms the data of the Perso component, i.e. the whole informational content necessary to carry out the personalization of some or all the application variables of each of the particular applications enclosed in the specific package to be loaded.

Within the Info attribute, there are several BER-TLV objects constituting a second level of TLVs which define the informational content pertaining to one particular application. Two different objects are defined:

The first object type is a TLV identifying the name of this particular application;
The second object type is a TLV containing all the required data for this particular application.

The Tag attribute of these objects is build with the 8th bit indicating whether it is an object of the first type (B8=1) or of the second type (B8=0). The other seven bits (B7 to B1) are used to identify the application within the custom component by an internal reference, thus allowing a connection to be defined between objects of the first and second types.

The Value attribute of an object of the first type is the name of the application, as an external or absolute reference of the application within the CAP file. More precisely, it is the full class path of this application as defined by the JAR format. In this manner, the Java Card Virtual Machine can easily identify the application corresponding to these TLVs.

The Value attribute of an object of the second type contains all the data requires for the personalization of the corresponding application. The data structure is another series of TLVs, forming a third level of TLVs.

At this third level, the Tag attribute corresponds to the variable number which is assigned to a particular variable to be personalized during the compilation of the Java application. More precisely, when a Java application is compiled, a Token number is assigned to each and every variable of a class. This Token number can be found in the class file of the JAR file as well as in the class component of the CAP file. The same Token number is generally valid in the Java Card Virtual Machine as well. According to the invention, this token is also used for the personalization process.

For basic variable types such as byte, char, short, byte[ ], char[ ],short[ ], or the like, the Value attribute directly contains the personalization value of the corresponding variable.

For complex variable types such as classes or objects, the Value attribute contain a full sequence of TLVs of a forth level.

For illustration purposes, let consider the example of the following two classes:

```
package com.cassis.sample
    public class CardUser extends Applet  {
        public byte[ ] firstName;
        public byte[ ] lastName;
        public byte age;
        public short dateOfBirth;
        public Address fullAddress;
    }
    public class Address  {
        public byte[ ] street1;
        public byte[ ] street2;
        public byte[ ] city;
        public byte[ ] state;
        public byte[ ] county;
        public byte[ ] postalCode;
    }
```

As can be seen, the first class CardUser contains the object Address which is defined by the second class Address. Such a second class is an example of a complex variable type. Below are listed sample data for this example:

```
firstName = Arun
lastName = Ganeswaran
age = 31
dateOfBirth = 27914
street1 = 51 Bras Basah Road
street2 = #08-07/08 Plaza by the Park
city = Singapore
state = Singapore
country = Singapore
postalCode = 189554
```

The resulting Perso component in hexadecimal format is:

```
00 b0 80 1a 63 6f 6d 2e 63 61 73 73 69 73 2e 73
61 6d 70 6c 65 2e 43 61 72 64 55 73 65 72 00 92
00 04 41 72 75 6e 01 0a 47 61 6e 65 73 77 61 72
61 6e 02 01 1f 03 02 6d 0a 04 77 80 19 63 6f 6d
2e 63 61 73 73 69 73 2e 73 61 6d 70 6c 65 2e 41
64 64 72 65 73 73 00 5a 00 12 35 31 20 42 72 61
73 20 42 61 73 61 68 20 52 6f 61 64 01 1b 23 30
38 2d 30 37 2f 30 38 20 50 6c 61 7a 61 20 62 79
20 74 68 65 20 50 61 72 6b 02 09 53 69 6e 67 61
70 6f 72 65 03 09 53 69 6e 67 61 70 6f 72 65 04
09 53 69 6e 67 61 70 6f 72 65 05 06 31 38 39 35
35 34
```

This stream of TLVs can be decoded as follows:

```
00 b0 Length of Perso Component = 172 bytes
80 Tag identifying Application Name
    1a Length of Application Name = 26 bytes
        63 6f 6d 2e 63 61 73 73 69 73 2e 73 61 6d 70 6c
        65 2e 43 61 72 64 55 73 65 72
        Application name is com.cassis.sample.CardUser
00  Tag identifying the Variables block
    92 Length of the Variables block
        00 Variable Token 0
            04 Length of variable = 4 bytes
                41 72 75 6e    Value = Arun
        01 Variable Token 1
            0a Length of variable = 10 bytes
                47 61 6e 65 73 77 61 72 61 6e    Value = Ganeswaran
        02 Variable Token 2
            01 Length of variable = 1 byte
                1f Value = 31
        03 Variable Token 3
            02 Length of variable = 2 bytes
                6d 0a    Value = 27914 (interpreted in the application)
        04 Variable Token 4
            77 Length of variable = 119 bytes
                80 Tag identifying Application Name
                    19 Length of Application Name = 25 bytes
                        63 6f 6d 2e 63 61 73 73 69 73 2e 73 61 6d 70
                        6c 65 2e 41 64 64 72 65 73 73
                        Application name is com.cassis.sample.Address
                00 Tag identifying the Variables block
                    5a Length of the Variables block = 90 bytes
                        00 Variable Token 0
                            12 Length of variable = 18 bytes
                                35 31 20 42 72 61 73 20 42 61 73 61 68
                                20 52 6f 61 64
                                Value = 51 Bras Basah Road
                        01 Variable Token 1
                            1b Length of variable = 27 bytes
                                23 30 38 2d 30 37 2f 30 38 20 50 6c 61
                                7a 61 20 62 79 20 74 68 65 20 50 61 72
                                6b
                                Value = #08-07/08 Plaza by the Park
                        02 Variable Token 2
                            09 Length of variable = 9 bytes
                                53 69 6e 67 61 70 6f 72 65
                                Value = Singapore
                        03 Variable Token 3
                            09 Length of variable = 9 bytes
                                53 69 6e 67 61 70 6f 72 65
                                Value = Singapore
                        04 Variable Token 4
                            09 Length of variable = 9 bytes
                                53 69 6e 67 61 70 6f 72 65
                                Value = Singapore
                        05 Variable Token 5
                            06 Length of variable = 6 bytes
                                31 38 39 35 35 34
                                Value = 189554
```

Java Card Virtual Machine Loader

While the application is being loaded, all the components of the CAP file are processed. Java Cards supporting this Perso component are able to identify whether the CAP file has a custom component and, if so, to process it on loading. This allows it to be used later in the installation process.

Java Cards not supporting such a Perso component can simply ignore it during loading and continue with the normal processing.

The Object Initializer

An Object Initializer module is a part of any Java Card Virtual Machine implementation. In prior art implementations, this module is called to initialize newly created variables with a default value, generally to zero.

The role of the Object Initializer according to the invention is to initialize the application variables and to personalize a subset of these variables by using the values provided in the Perso component. This personalization process occurs when the Install_for_Install command is called for the installation of a specific application.

If the considered application has a corresponding Perso component, then the Java Card Virtual Machine refers to this corresponding Personal component every time a variable is being created. Through this step of referring to the Perso component, the Java Card Virtual Machine is able to retrieve the personalization value if it exists, and, at the same time, use it to initialize the variable.

Thus, this overall process ensures that the application is fully personalized on the completion of the Install_for_install command.

Perso Component Generation

In order for the Perso component to be useful, its generation must be efficiently integrated into the current generation and deployment process of applications.

This is the reason why a Perso component generator is used. As illustrated in FIG. 1, the generator 1 takes as input the application information from a JAR file 2 and the personalization values retrieved from a database 3. By cross-referencing the data of the JAR file 2 with data provided from the database 3, it is possible to determine all the variables which are to be personalized among all the variables of a particular application.

Based on these inputs and the rules of encoding a Perso component, generator 1 can then create as output the Perso component 5 for every personalization profile recorded in the database 3. More precisely, from generator 1, a specific package 4 for each and every corresponding record of the database 3 is obtained which encapsulates an application Jar file 6, similar to the Jar file 2, together with the Perso component 5. In package 4, application Jar file 6 and Perso component 5 are correctly linked.

The Perso component generation step can be integrated into the application deployment. The generation takes place when an application has already been compiled and is available in the JAR file format. A personalization centre receives from their client the application to be loaded onto the Java cards either in a compile format or in an uncompiled format, also known as a source code format. If the received application is not yet compiled, the standard Java card compilation procedures are used to compile the source code in order to obtain the corresponding JAR file. Afterwards, generator 1 is used to complete the process flow.

Although a particular embodiment has been described, this was for the purpose of illustrating, but not limiting, the invention. Various alternative embodiments, which will come readily to the mind of the person skilled in the art, are within the scope of the invention as defined by the appended claims.

The invention claimed is:

1. A method of personalizing at least one application configured to be executed on a smartcard, said method respecting a Java Card Specification having at least loaded, installed, and personalized states, comprising:
 a. extracting, from a database in a memory on a smartcard, information required to personalize an application;
 b. generating, by a processor only on said smartcard, a package conforming to the Java Card Platform Specification containing mandatory components corresponding to at least one application, and a custom component corresponding to said information required to personalize, in accordance with the Java Card Platform Specification, the said at least one application;
 c. loading the said package onto said smartcard;
 d. installing said application from the said loaded package, the said at least one application being personalized on said smartcard with said information corresponding to said application, said information including particular values, using said custom component, immediately and automatically as soon as the said application is in the installed state at the end of the completion of the said step of installing, wherein no additional set of commands or operations is required to personalize said at least one application.

2. A method according to claim 1, wherein generating a package further includes taking as input a first file containing only said mandatory components corresponding to the said at least one application, and a second file containing data required to personalize the said at least one application, in order to generate, as output, the said package.

3. A method according to claim 2, wherein generating a package further includes extracting from a database said data required to personalize the said at least one application and to produce the said second file before generating the said package.

4. A method according to claim 1, wherein installing further includes initializing objects for referring to the said custom component each time an application variable is created, while executing an install command.

5. A non-transitory computer-readable storage media having a package for execution on a smartcard stored thereon, the package conforming to a Java Card Platform Specification having at least loaded, installed, and personalized states, comprising:
 information required to personalize an application stored in and adapted to be extracted from a database in a memory on a smartcard;
 at least one application configured to be executed on a processor of said smartcard conforming to the Java Card Platform Specification;
 a custom component corresponding to said information required to personalize, in accordance with the Java Card Platform Specification, the said at least one application, said information including particular values;
 said custom component configured to be loaded and installed on said smartcard; and
 said at least one application configured to be personalized on said smartcard according to said custom component using said custom component, immediately and automatically as soon as the application is in the Installed state, wherein no additional set of commands or operations is required to personalize said at least one application.

6. A package according to claim 1, wherein said package is a JAR file.

7. A package according to claim 1, wherein said package is a CAP file.

8. A non-transitory computer-readable storage media having a custom component generator for execution on a smartcard stored thereon for generating as output a package conforming to a Java Card Platform Specification having at least loaded, installed, and personalized states, the custom component generator comprising:
 information required to personalize an application stored in and adapted to be extracted from a database in a memory on a smartcard;
 at least one application configured to be executed on a processor of said smartcard conforming to the Java Card Platform Specification;
 a custom component corresponding to information required to personalize, in accordance with the Java Card Platform Specification, the said at least one application, said information including particular values;

said custom component configured to be loaded and installed on said smartcard; and said at least one application configured to be personalized on said smartcard according to said custom component using said custom component, immediately and automatically as soon as the application is in the Installed state, wherein no additional set of commands or operations is required to personalize said at least one application.

9. A custom component generator according to claim 8, wherein said custom component generator is configured to receive as input a first file containing only the said mandatory components corresponding to said at least one application, and a second file containing data required to personalize said at least one application.

10. A non-transitory computer-readable storage media having an object initializer stored thereon for execution on a smartcard, the object initializer comprising:

referring, each time an application variable is created, to a custom component of a loaded package conforming to a Java Card Platform Specification having at least loaded, installed, and personalized states and adapted to be executed on a processor of a smartcard, said custom component correlating information required to personalize, in accordance with the Java Card Platform Specification, at least one application on said smartcard using said custom component, immediately and automatically when said application is in the Installed state, wherein said information includes particular values and is adapted to be extracted from a database in a memory on said smartcard, wherein said custom component is configured to be loaded and installed on a smartcard, and wherein no additional set of commands or operations is required to personalize said at least one application.

11. A non-transitory computer-readable storage media having a custom component generator stored thereon for execution on a smartcard, comprising:

extracting, from a database in a memory on a smartcard, information required to personalize an application; and generating as output a package conforming to a Java Card Platform Specification having at least loaded, installed, and personalized states, comprising:

at least one application configured to be executed on a processor of said smartcard;

a custom component corresponding to said information required to personalize, in accordance with the Java Card Platform Specification, the said at least one application, said information including particular values;

said custom component configured to be loaded and installed on said smartcard; and said at least one application configured to be personalized on said smartcard according to said custom component using said custom component, immediately and automatically as soon as the application is in the Installed state, wherein no additional set of commands or operations is required to personalize said at least one application.

12. A method for initializing an object comprising:

extracting, from a database in a memory on a smartcard, information required to personalize an application;

generating, by a processor on a processor of said smartcard, a package containing mandatory components corresponding to at least one application, and a custom component corresponding to said information required to personalize, in accordance with a Java Card Platform Specification having at least loaded, installed, and personalized states, the said at least one application, said information including particular values;

loading the said package onto said smartcard; and referring, each time an application variable is created, to said custom component of said loaded package conforming to the Java Card Platform Specification, said custom component correlating information required to personalize at least one application on said smartcard using said custom component, immediately and automatically when said application is in the Installed state, and said custom component configured to be loaded and installed on a smartcard.

\* \* \* \* \*